No. 761,211. PATENTED MAY 31, 1904.
J. R. DANNER.
DUMPING HAY RAKE.
APPLICATION FILED APR. 30, 1903.
NO MODEL. 3 SHEETS—SHEET 1.

Witnesses
Inventor
J. R. Danner.
By
Attorneys

No. 761,211. PATENTED MAY 31, 1904.
J. R. DANNER.
DUMPING HAY RAKE.
APPLICATION FILED APR. 30, 1903.
NO MODEL. 3 SHEETS—SHEET 2.
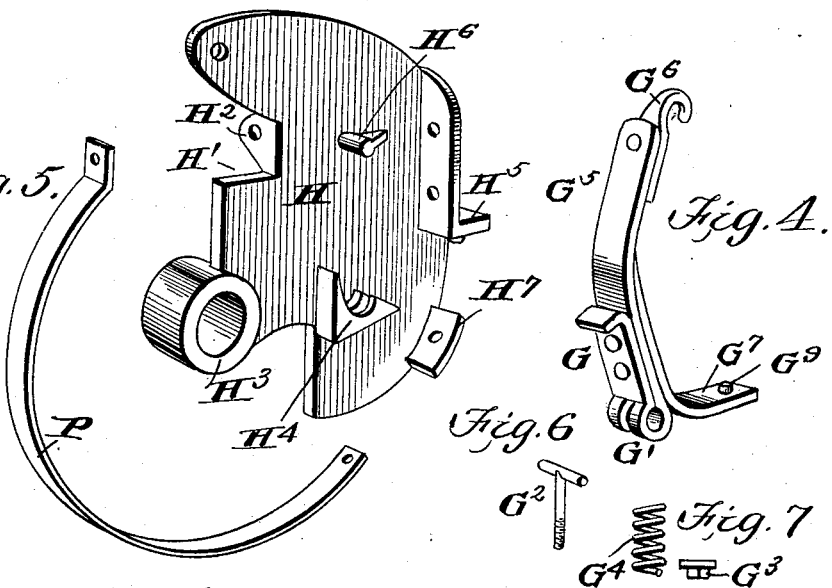
Inventor
J. R. Danner.
Witnesses No. 761,211.  
Patented May 31, 1904.

UNITED STATES PATENT OFFICE.

JOHN R. DANNER, OF MARSHFIELD, WISCONSIN.

DUMPING HAY-RAKE.

SPECIFICATION forming part of Letters Patent No. 761,211, dated May 31, 1904.

Application filed April 30, 1903. Serial No. 155,066. (No model.)

*To all whom it may concern:*

Be it known that I, JOHN R. DANNER, a citizen of the United States, residing at Marshfield, in the county of Wood and State of Wisconsin, have invented a new and useful Dumping Hay-Rake, of which the following is a specification.

This invention relates generally to hay-rakes, and more particularly to one adapted to dump the load by elevating the rake and stripping the load therefrom; and the object of the invention is to provide an improved mechanism for raising the rake, said mechanism being operated by means of a foot-lever, thereby leaving the driver the free use of both hands at all times.

Another object of my invention is to provide a device in which the rake can be automatically held after being elevated or after the load has been discharged; and a still further object is to provide a device in which the rake can be dropped automatically after being elevated or after the load has been discharged and to provide means for taking up the jar incidental to the dropping of the rake.

With these objects in view the invention consists in the novel features of construction, combination, and arrangement, all of which will be fully described hereinafter and pointed out in the claims.

Figure 1:
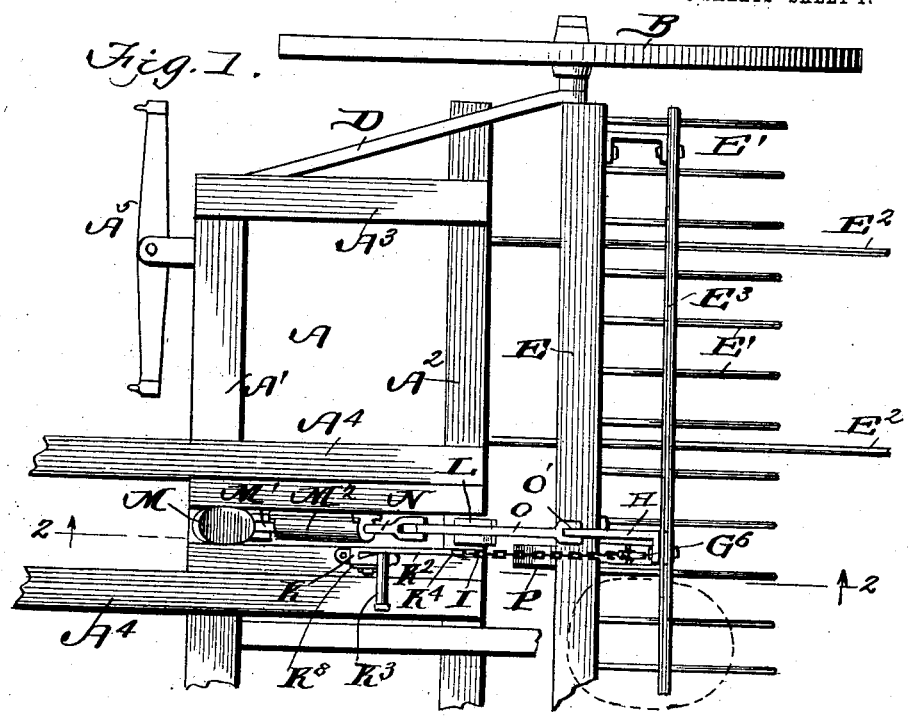
Figure 2:
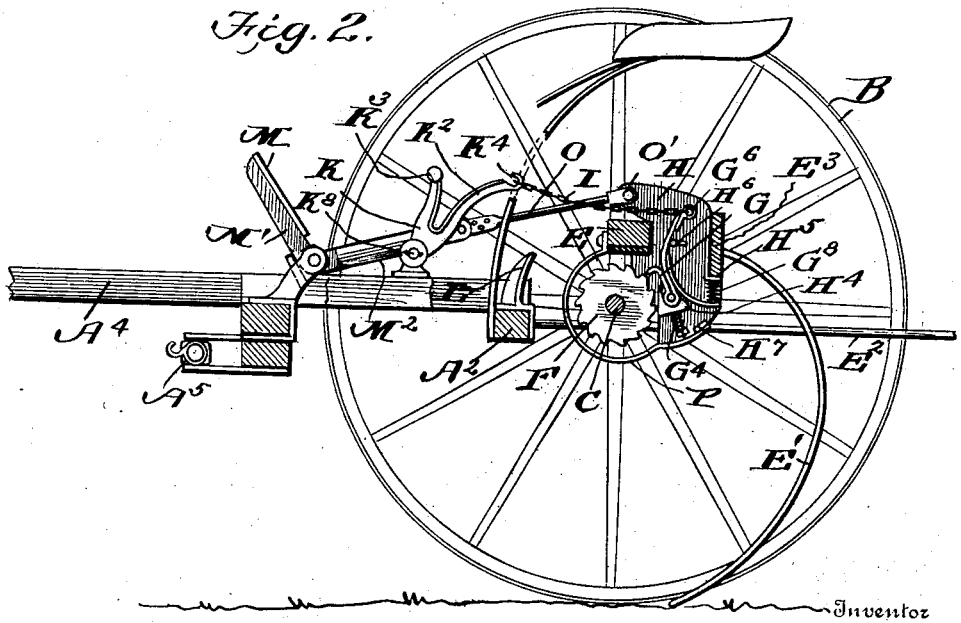
Figure 77:
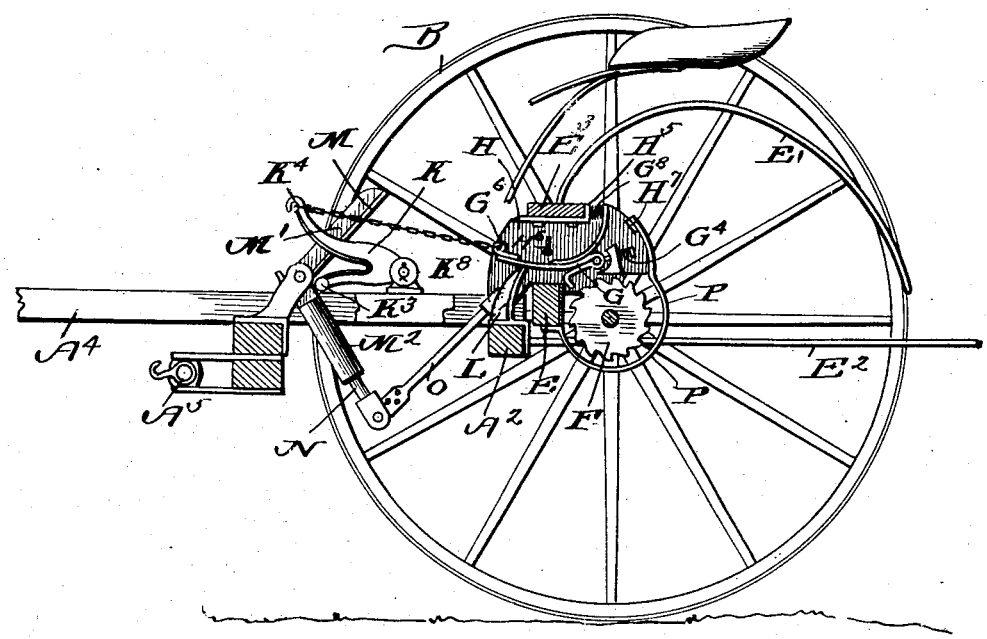
Figure 78:
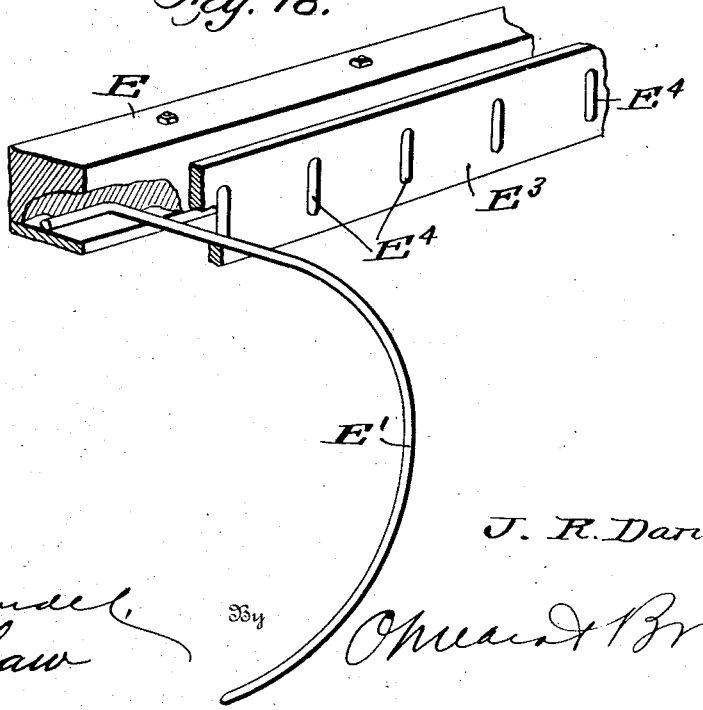

In the drawings forming part of this specification, Figure is a top plan view showing one end of the rake constructed in accordance with my invention. Fig. 2 is a view taken on the line 2 2 of Fig. 1 looking in the direction of the arrow. Fig. 3 is a detail perspective view of the casting-plate. Fig. 4 is a detail perspective view of the pawl and members connected thereto. Fig. 5 is a view showing the curved band adapted to protect the ratchet-wheel arranged upon the axle of the machine. Fig. 6 is a detail perspective view of the T-bolt employed for connecting the pawl to the casting-plate. Fig. 7 is a view illustrating the spring and nut which are connected to the shank of the T-bolt for the purpose of exerting a tension upon the pawl. Fig. 8 is a detail perspective view of the tripping-iron. Fig. 9 is a view illustrating one of the foot-levers. Figs. 10, 11, and 12 are details of the mechanism for returning the foot-lever to its normal position. Fig. 13 is a detail sectional view showing the manner of pivoting the said foot-lever. Fig. 14 is a view showing two elevations of the pivot-bolt. Fig. 15 is a detail view, partly in section, illustrating the spring-pitman. Fig. 16 is a sectional view on the line 16 16 of Fig. 15. Fig. 17 is a sectional view similar to Fig. 2, showing the position of the parts when the rake-teeth are elevated. Fig. 18 is a perspective view, parts being broken away and shown in section, illustrating the manner of securing the rake-teeth to the beam and showing the tooth-guard.

In carrying out my invention I employ a frame A, comprising the beams A' and $A^2$, connected at their ends by the timbers $A^3$ and intermediate their ends by the timbers $A^4$, which project beyond the frame and have the draft-beam connected thereto. Each end of the frame A has a swingletree or other draft appliance $A^5$ connected thereto. This frame is supported upon ground-wheels B, the frame and axle being connected by means of suitable rods D, and pivotally connected to the axle so as to revolve upon the same is the beam E, having the rake-teeth E' connected thereto, said beam and rake-teeth being of the usual or any approved construction.

A series of stripping-fingers $E^2$ are connected to the beam $A^2$ of the frame A and extend rearwardly below the axle between and beyond the rake-teeth E', so that when the said rake-teeth are elevated the fingers $E^2$ will strip the load therefrom, thereby causing the load to be dumped at the point where the rake-teeth are elevated.

In order to elevate the rake so as to dump same, I employ a ratchet-wheel F, which is rigidly mounted upon the axle C adjacent to the center of the same, and this ratchet-wheel is adapted to be engaged by a pawl G, pivotally arranged upon the casting-plate H and operated by means of a chain I and foot-lever K, said parts being so constructed and arranged that by pressing upon the foot-lever the pawl is thrown into engagement with the ratchet-wheel, and the continued rotation of the ratchet-wheel will cause the casting-plate to turn and carry with it the beam E, which is rigidly connected to the casting-plate, being seated in an angled cut-out portion H' and secured to a laterally-projecting ear H². This casting-plate is formed with a tubular bearing H³, through which the axle C passes and is also provided with a recessed and bifurcated boss H⁴, in which the lower and bifurcated end G' of the pawl G is seated, said pawl being secured in said boss by means of a T-shaped bolt G², the head of which passes through the bifurcated portion of the pawl and extends downwardly through the bifurcated boss H⁴ and has a nut G³ upon its lower end, and surrounding the bolt and bearing upon the nut and the lower face of the boss H⁴ is a coil-spring G⁴, the purpose of which it to exert a constant tension upon the pawl and keep it firmly seated in the boss H⁴. The pawl G has an upwardly-extending arm G⁵, carrying a hook G⁶, and in practice I prefer to construct this arm and pawl from a single piece of metal which is bent upon itself, as shown, and shaped into the suitable bearing which is bifurcated at G', as previously described.

The chain I is connected to the hook G⁶, and, as previously stated, the pawl is operated by pressing upon the foot-lever K, causing the nose of the pawl to be thrown into engagement with the ratchet-wheel F. The pawl is also provided with a rearwardly-extending foot-piece G⁷, against which a coil-spring G⁸ bears, the opposite end of said spring bearing against a flange H⁵, formed upon the casting-plate H. A lug G⁹ is formed on the foot G⁷, the lower end of the spring G⁸ encircling the lug and being held in place by it. The purpose of this spring is to aid in holding the pawl in its normal or inoperative position. Bolted to and supported by the flange H⁵ is a tooth-guard E³, having a plurality of vertical slots E⁴ equal in number to the number of teeth, and through these slots the teeth E' work. This guard aids in supporting the teeth and protects them from severe strains.

A stop-post H⁶ projects from the face of the casting-plate H and serves to limit the rearward movement of the arm G⁵ of the pawl G, thereby holding the pawl in close proximity to the ratchet-wheel, so that a very slight movement of the foot-lever will be sufficient to throw the nose of the pawl into engagement with the ratchet-wheel. When the pawl is thrown into engagement with the ratchet-wheel, the continued movement of said ratchet-wheel will raise the casting-plate, carrying it around the axle and with it the beam E, causing the rake-teeth to be elevated, so as to dump the material accumulated by the said rake-teeth, and in order to disengage the rake after it has been elevated to the desired extent I employ a tripping-iron L, which is mounted upon the beam A² of the frame A and projects upwardly and slightly rearwardly, so that it will clear the beam E and engage the upper portion of the arm G⁵, thereby throwing the pawl out of engagement with the ratchet-wheel, and the moment the said pawl is disengaged the rake will drop back to its normal position and all of the parts will be returned to the positions shown in Fig. 2. The foot-lever K comprises two members K' and K², the member K' carrying a pedal K³, upon which the foot of the operator is placed, while the member K² terminates in a hook K⁴, to which the forward end of the chain I is attached. The lever is formed with a tubular bearing K⁵, which is surrounded by an annular flange K⁶, producing a chamber within which a coil-spring K⁷ is arranged, one end of the said spring being fastened to the flange K⁵, while the opposite end is fastened to a cap-piece K⁸, the pivot-bolt K⁹, upon which the lever turns, being held fast in a bracket K¹⁰, and the cap-piece K⁸ is rigid with the bolt, inasmuch as the ends of said bolt are square, as most clearly shown in Fig. 14. By means of this construction the lever will be held in its rearmost position, as indicated in Fig. 2, and the spring K⁷ will serve to return the said lever to such position the moment tension is relieved therefrom. The treadle M is arranged upon the forward member of the elbow-lever M', the rear member having a sleeve M² connected therewith and in which moves a rod N, having a head N' at the forward end, and surrounding said rod within the sleeve is a spring N², the normal tendency of which is to hold the rod N in a forwardly-projected position, said rod N being pivotally connected to a link O, which is pivotally connected at its rear end to the upper end of the casting-plate H, as shown at O' in Fig. 2. The rod N is formed with a series of perforations through which the pivot-bolt connecting the link and rod is adapted to be passed, and by having a plurality of perforations the rake can be adjusted to any desired height, it being understood that the position of the casting-plate, and consequently the position of the rake, is regulated by the length of the link N and rod O, the spring N² holding all of the said parts under the proper tension, and when the lifting mechanism is disengaged and the rake dropped this spring will take up the jar and hold the rake in its proper position.

A band P is connected at its upper end to the beam E and encircles the ratchet-wheel F, the lower end of said band being connected to the perforated ear H⁷, projecting through the casting-plate H. This band serves to protect the ratchet-wheel and prevent grass or weeds becoming entangled therewith. By pressing upon the treadle M the rake will be firmly held to the ground while accumulating its load.

When it is desired to dump the rake, it is only necessary to press sufficiently upon the pedal K³ to bring the pawl into engagement with the ratchet-wheel, and the continued forward movement of the machine will cause the rake to be elevated completely, bringing the tripping-iron into operation, which will disengage the pawl from the ratchet-wheel, causing the rake-teeth to automatically fall back into operative position and to be held there by the rod N, link O, and spring N²; but by continuing the pressure upon the pedal K³ on and after the elevation of the teeth and disengagement of the pawl from the ratchet-wheel the pawl will be drawn forward out of the seat H⁴ and held out of the said seat. When said pressure is removed, the pawl is again drawn back into its seat by the spring G⁴, and spring G⁸ will force it into operative position.

It may be stated that when the pawl is drawn out of the seat H⁴ it is effectively prevented from catching into the ratchet-wheel. After the rake is dumped the rake-teeth can be held up or dropped at any desired place at the will of the operator.

Having thus fully described my invention, what I claim as new, and desire to secure by Letters Patent, is—

1. A device of the kind described comprising a wheeled frame and axle, a plate formed with a tubular bearing adapted to rotate on the axle, said plate having a recessed, bifurcated boss normally in the horizontal plane of the axle, the forward edge of the plate above the axle having an angular cut-out portion, a stop-pin arranged on the plate, a pawl bifurcated at its lower end, said lower end being seated in the recess of the boss, a T-shaped bolt having a head adapted to pass through the bifurcated portion of the pawl the bolt being adapted to extend through the bifurcated portion of the boss, springs adapted to normally hold the pawl in its seat, a beam adapted to fit in the cut-out portion of the plate, rake-teeth carried by the beam, a ratchet rigidly mounted on the axle adjacent the plate and means for throwing the pawl into engagement with the ratchet.

2. In a hay-rake, an axle, a casting-plate rotatable about the axle, a beam supported by the said plate, teeth carried by the beam, a ratchet-wheel rigid on the axle, a pawl carried by the plate adapted to engage the ratchet, a lever comprising upwardly-extending members curved in opposite directions, tubular bearing formed below the juncture of the members, a pedal carried by one of the members, a hook at the free end of the opposite member, an annular flange surrounding the bearing, a stationary cap-piece, a spring coiled around the bearing and secured at one end to the flange and at the opposite end to the cap-piece, and connecting means between the member carrying the hook and the pawl, substantially as described and for the purpose set forth.

3. In a rake of the kind described, the combination with the main frame, axle and wheels, of a rake, a casting-plate pivotally mounted upon the axle and rigidly connected to the rake, a ratchet-wheel mounted upon the axle, a pawl arranged upon the casting-plate, a spring-actuated T-bolt connected with the pawl, said pawl having an upwardly-extending arm and a rearwardly-projecting foot-piece, a spring adapted to bear upon the said foot-piece, a stop-pin carried by the casting-plate, a tripping-iron arranged upon the main frame and adapted to engage the upwardly-extending arm of the pawl, a foot-lever having a spring-actuated return mechanism a chain connecting the foot-lever, and the upper end of the pawl-arm, an elbow-lever mounted upon the frame having a treadle connected to one member and a sleeve to the opposite member, a headed rod arranged in the sleeve, and a spring arranged in the sleeve and surrounding the said rod, and the link connecting the rod and the upper end of the casting-plate, substantially as described.

JOHN R. DANNER.

Witnesses:
WILLIAM BARTELS,
FRANK DANNER.